US012012308B2

(12) United States Patent
Kattainen et al.

(10) Patent No.: US 12,012,308 B2
(45) Date of Patent: Jun. 18, 2024

(54) METHOD AND AN ELEVATOR FOR AUTOMATIC ELEVATOR CONDITION CHECKING

(71) Applicant: KONE Corporation, Helsinki (FI)

(72) Inventors: Ari Kattainen, Helsinki (FI); Ari Ketonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1379 days.

(21) Appl. No.: 16/506,789

(22) Filed: Jul. 9, 2019

(65) Prior Publication Data

US 2019/0330017 A1 Oct. 31, 2019

Related U.S. Application Data

(63) Continuation of application No. PCT/FI2017/050208, filed on Mar. 24, 2017.

(51) Int. Cl.
*B66B 1/28* (2006.01)
*B66B 1/34* (2006.01)
(Continued)

(52) U.S. Cl.
CPC ................ *B66B 5/021* (2013.01); *B66B 1/28* (2013.01); *B66B 1/3446* (2013.01);
(Continued)

(58) Field of Classification Search
CPC ......... B66B 5/021; B66B 1/28; B66B 1/3446; B66B 1/3492; B66B 3/002; B66B 5/0025;
(Continued)

(56) References Cited

U.S. PATENT DOCUMENTS

2009/0114484 A1 5/2009 Watanabe et al.

FOREIGN PATENT DOCUMENTS

JP 2007-210713 A 8/2007
JP 2008-50168 A 3/2008
(Continued)

OTHER PUBLICATIONS

International Search Report (PCT/ISA/210) issued in PCT/FI2017/050208, dated Jun. 29, 2017.
(Continued)

*Primary Examiner* — Jeffrey Donels
(74) *Attorney, Agent, or Firm* — Birch, Stewart, Kolasch & Birch, LLP

(57) ABSTRACT

A method and an apparatus for automatic condition checking of an elevator are provided, wherein an elevator car of the elevator is situated in a door zone of a first landing in an elevator shaft following an earthquake. The method includes determining whether the load carried by hoisting ropes is evenly distributed between the hoisting ropes by checking the status or measurement data of at least one rope tension measurement device. The test unit determines whether the elevator car is empty and conducts a drive test for the elevator car in order to determine unimpeded access for the elevator car to other landings. The elevator is returned to normal use, if the drive test indicates unimpeded access for the elevator car to the other landings.

20 Claims, 3 Drawing Sheets

(51) Int. Cl.

| | |
|---|---|
| ***B66B 3/00*** | (2006.01) |
| ***B66B 5/00*** | (2006.01) |
| ***B66B 5/02*** | (2006.01) |
| ***B66B 7/12*** | (2006.01) |
| ***B66B 13/22*** | (2006.01) |

(52) U.S. Cl.
CPC ............ *B66B 1/3492* (2013.01); *B66B 3/002* (2013.01); *B66B 5/0025* (2013.01); *B66B 5/0031* (2013.01); *B66B 5/0037* (2013.01); *B66B 7/1215* (2013.01); *B66B 13/22* (2013.01)

(58) Field of Classification Search
CPC ... B66B 5/0031; B66B 5/0037; B66B 7/1215; B66B 13/22; B66B 5/0006; B66B 5/022
See application file for complete search history.

(56) References Cited

FOREIGN PATENT DOCUMENTS

| | | | | |
|---|---|---|---|---|
| JP | 5235888 B2 | | 10/2013 | |
| KR | 10-2008-0036005 A | | 4/2008 | |
| WO | WO-2007067491 A2 | * | 6/2007 | ............ B66B 5/022 |
| WO | WO2007/099619 A1 | | 9/2007 | |

OTHER PUBLICATIONS

Written Opinion of the International Searching Authority (PCT/ISA/237) issued in PCT/FI2017/050208, dated Jun. 29, 2017.

* cited by examiner

METHOD AND AN ELEVATOR FOR AUTOMATIC ELEVATOR CONDITION CHECKING

CROSS REFERENCE TO RELATED APPLICATIONS

This application is a Continuation of PCT International Application No. PCT/FI2017/050208 filed on Mar. 24, 2017, which is hereby expressly incorporated by reference into the present application.

BACKGROUND OF THE INVENTION

Field of the Invention

The invention relates to elevators, elevator maintenance, elevator condition checking and a method for automatic an elevator condition checking.

Description of the Related Art

Nowadays, there is a large installation base of elevators in seismically active geographical areas. The elevators in seismically active areas represent a problem for maintenance. In order to ensure that any damage possibly caused by an earthquake to an elevator does not pose a threat to passengers, the elevators are equipped with seismic detection devices. A seismic detection device determines whether a magnitude of a seismic event such as an earthquake exceeds a predefined threshold value. If the threshold value is exceeded, at least one elevator associated with the seismic detection device is put out of service. An elevator that has been put out of service due to a seismic event can only be put back to service following a manual reset performed by a maintenance person. The maintenance person must inspect the elevator visually before the resetting. Following a seismic event, such as an earthquake, elevators in the area affected by the seismic event may be out of service for a very long time, because limited service personnel must conduct the visits to each of the elevators. Further, if seismic events are frequent in a given area, the elevators in the area may be out of service most of the time.

Therefore, it would be beneficial if elevators put out of service due to an earthquake activity could be automatically reset. However, the safety of the elevators must still be ensured.

SUMMARY OF THE INVENTION

According to an aspect of the invention, the invention is a method for automatic condition checking of an elevator, wherein an elevator car of the elevator is positioned in a door zone of a first landing in an elevator shaft following an earthquake, the method comprising: determining, by at least one elevator test unit, whether the load carried by hoisting ropes is evenly distributed between the hoisting ropes by checking the status or measurement data of at least one rope tension measurement device; determining, by the at least one elevator test unit, using at least one elevator car sensor that the elevator car is empty; conducting, by the at least one elevator test unit, a drive test for the elevator car in order to determine unimpeded access for the elevator car to at least one second landing, in response to the determining that the plurality of elevator ropes remain in place in the respective grooves and that the elevator car is empty; and returning the elevator to normal use, in response to the drive test indicating unimpeded access for the elevator to at least one second landing.

According to a further aspect of the invention, the invention is an apparatus comprising at least one processor and at least one memory including computer program code, the at least one memory and the computer program code configured to, with the at least one processor, cause the apparatus at least to perform: determining, by the apparatus, whether the load carried by hoisting ropes is evenly distributed between the hoisting ropes by checking the status or measurement data of at least one rope tension measurement device; determining, by the apparatus, using at least one elevator car sensor that the elevator car is empty, wherein the elevator car of the elevator is positioned in a door zone of a first landing in an elevator shaft following an earthquake; conducting, by the apparatus, a drive test for the elevator car in order to determine unimpeded access for the elevator car to at least one second landing, in response to the determining that the plurality of elevator ropes remain in place in the respective grooves and that the elevator car is empty; and returning the elevator to normal use, in response to the drive test indicating unimpeded access for the elevator to at least one second landing.

According to a further aspect of the invention, the invention is an elevator comprising the apparatus.

According to a further aspect of the invention, the invention is an apparatus for an elevator, the apparatus comprising: means for determining whether the load carried by hoisting ropes is evenly distributed between the hoisting ropes by checking the status or measurement data of at least one rope tension measurement device; means for determining, by the apparatus, using at least one elevator car sensor that the elevator car is empty, wherein the elevator car of the elevator is positioned in a door zone of a first landing in an elevator shaft following an earthquake; means for conducting, by the apparatus, a drive test for the elevator car in order to determine unimpeded access for the elevator car to at least one second landing, in response to the determining that the plurality of elevator ropes remain in place in the respective grooves and that the elevator car is empty; and means for returning the elevator to normal use, in response to the drive test indicating unimpeded access for the elevator to at least one second landing.

According to a further aspect of the invention, the invention is a computer program comprising code adapted to cause the following when executed on a data-processing system: determining, by at least one elevator test unit, whether the load carried by hoisting ropes is evenly distributed between the hoisting ropes by checking the status or measurement data of at least one rope tension measurement device; determining, by the at least one elevator test unit, using at least one elevator car sensor that the elevator car is empty, wherein the elevator car of the elevator is positioned in a door zone of a first landing in an elevator shaft following an earthquake; conducting, by the at least one elevator test unit, a drive test for the elevator car in order to determine unimpeded access for the elevator car to at least one second landing, in response to the determining that the plurality of elevator ropes remain in place in the respective grooves and that the elevator car is empty; and returning the elevator to normal use, in response to the drive test indicating unimpeded access for the elevator to at least one second landing.

According to a further aspect of the invention, the invention is a computer program product comprising the computer program.

In one embodiment of the invention, an elevator rope shackle comprises securing means, for example, a gyve, to which an elevator rope may be attached or secured. The securing means is connected using a spring to a point of attachment in a supporting structure in elevator shaft. The spring may have inside it a threaded shaft which allows controlling of spring maximum length.

In one embodiment of the invention, the elevator car may also be referred to as elevator cage. The elevator car may be elevator cage.

In one embodiment of the invention, the method further comprises: before the conducting of the drive test, determining, by the at least one elevator test unit, using an accelerometer associated with the elevator car that a predefined time has elapsed since a latest signal from the accelerometer indicates an acceleration exceeding a predefined threshold, the accelerometer being communicatively connected to the at least one elevator test unit, the predefined threshold being indicative of a lack of seismic activity.

In one embodiment of the invention, the method further comprises: reading, by the at least one elevator test unit, the torque required at a traction sheave to keep the elevator car stationary in the elevator shaft as a function of the elevator car position in the elevator shaft and load in the elevator car from a memory associated with the at least one elevator test unit; comparing the stored torque information to the actual net torque required to keep the elevator car stationary after an earthquake; and determining, in the at least one elevator test unit, that the counterweight is intact in response to the stored torque information matching the net torque, before the conducting of the drive test for the elevator car.

In one embodiment of the invention, the step of conducting the drive for the elevator car comprises: performing, by an frequency converter, a plurality of power consumption measurements at regular intervals from the power consumed by an electrical motor coupled to the traction sheave; transmitting, from the frequency converter, the plurality of power consumption measurements to the at least one elevator test unit; comparing, by the at least one elevator test unit, the plurality of power consumption measurements to a plurality of reference values stored in a memory associated with the at least one elevator test unit; determining that elevator car guide rails and counterweight guide rails are intact, in response to the plurality of power consumption measurements matching the plurality of reference values; and indicating correct functioning of the elevator, in response to the determining that the elevator car guide rails and the counterweight guide rails are intact.

In one embodiment of the invention, the step of conducting the drive test for the elevator car comprises: performing a plurality of strain measurements indicating strain in a point of attachment of an elevator travelling cable in the elevator shaft or the elevator car, the elevator travelling cable being suspended from the elevator car and the elevator shaft; comparing, by the at least one elevator test unit, the plurality of strain measurements to a plurality of reference values stored in a memory associated with the at least one elevator test unit; and determining that the elevator travelling cable is not entangled in response to the plurality of strain measurements matching the plurality of reference values; and indicating correct functioning of the elevator, in response to the determining that the elevator travelling cable is not entangled.

In one embodiment of the invention, the step of conducting the drive test for the elevator comprises: driving the elevator car to at least one second landing; opening the landing doors in the at least one second landing; opening the elevator car doors in the at least one second landing; determining that safety switches in the landing doors and the elevator car doors open and close correctly; determining, based on comparing electrical power consumption measurements executed by s door controller upon opening and closing of the landing doors to electrical power consumption measurements stored in a memory, that friction while opening and closing of the landing doors is within predefined limits; and indicating correct functioning of the elevator, in response to the determining that the safety switches in the landing doors and the elevator car doors open and close correctly and that the friction measured while opening and closing of the landing doors is within predefined limits.

In one embodiment of the invention, a warning signal is given to elevator users while opening the landing doors and the elevator car doors in the at least one second landing, the warning signal being indicative of elevator test drive.

In one embodiment of the invention, the method further comprises: determining a presence of a communication connection between the at least one elevator test unit and at least one circuit board in the elevator car, the communication connection being provided via a travelling cable suspended from the elevator shaft and the elevator car, the at least one elevator test unit being located outside the elevator car in association with the elevator shaft; and if the communication connection is present, enabling the conducting of the drive test.

In one embodiment of the invention, the method further comprises: detecting lighting in the elevator car by a light sensor communicatively connected to the at least one elevator test unit, the lighting being powered via a travelling cable suspended from the elevator shaft and the elevator car; determining a presence of an electrical connection via the bus cable, in response to the detecting of the lighting; and if the electrical connection via the bus cable is present, enabling the conducting of the drive test.

In one embodiment of the invention, the method further comprises: detecting a plurality of light signals in a plurality of light curtain sensors associated with a door of the elevator car, the plurality of light signals being transmitted from a plurality of light sources, the light sources being powered via a travelling cable suspended from the elevator shaft and the elevator car; and enabling the conducting of the drive test, in response to the detecting of the plurality of light signals.

In one embodiment of the invention, the method further comprises: determining a position of the elevator car within the door zone; and comparing determined position of the elevator car within the door zone to a position of the elevator car stored in a memory associated with the at least one elevator test unit when the elevator car stopped in the door zone, the stopping having occurred before the earthquake, if the position determined matches the position store in the memory, enabling the conducting of the drive test.

In one embodiment of the invention, the computer program is stored on a non-transitory computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, an apparatus comprising at least one processor and at least one memory including computer program code, the at least one memory and the computer program code are configured to, with the at least one processor, cause the apparatus at least to perform a method according to any of the method steps.

In one embodiment of the invention, the at least one processor of the apparatus, for example, of the safety controller may be configured to perform any of the method steps disclosed hereinabove.

In one embodiment of the invention, an elevator test unit comprising at least one processor and a memory may be configured to perform any of the method steps disclosed hereinabove.

The embodiments of the invention described herein may be used in any combination with each other. Several or at least two of the embodiments may be combined together to form a further embodiment of the invention. A method, an apparatus, a computer program or a computer program product to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to improved elevator safety and improved elevator availability.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
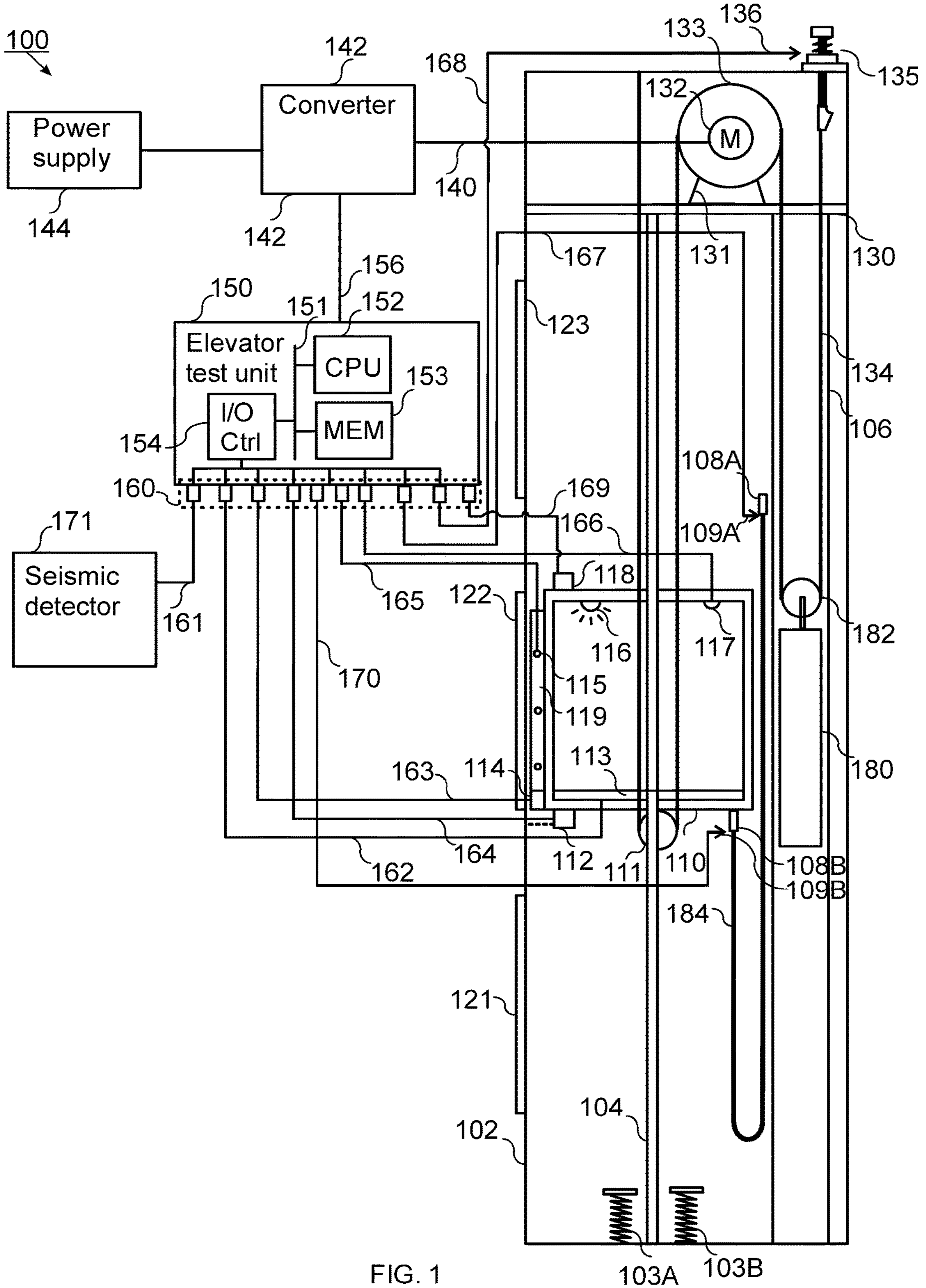
FIG. 1 illustrates an elevator comprising an elevator test system for testing the elevator after an earthquake in one embodiment of the invention.

FIG. 1 illustrates an elevator comprising an elevator test system for testing the elevator after an earthquake in one embodiment of the invention.

In FIG. 1 there is illustrated an elevator 100. Elevator 100 operates in an elevator shaft 102. Elevator shaft 102 comprises guide rails 104 for an elevator car 110 and guide rails 106 for a counterweight 180. Guide rails 104 enable elevator car 110 to be moved in vertical direction in a controlled horizontal position with respect to walls in elevator shaft 102 and landing doors in elevator shaft. Similarly, guide rails 106 enable counterweight 180 to be moved in vertical direction in a controlled horizontal position. For example, the elevator car 110 or counterweight 180 does not bounce with walls of elevator shaft 102. Elevator car 110 is suspended on a plurality of parallel hoisting ropes 134 looped over a traction sheave 133. Traction sheave 133 has a respective plurality of parallel grooves for the plurality of hoisting ropes 134. Counterweight 180 is also suspended on the plurality of hoisting ropes 134. Elevator car 110 and counterweight 180 are suspended on opposite sides of traction sheave 133. Hoisting ropes 134 may be fixed, for example, to an upper part of elevator shaft 102 or to the elevator car, depending on the roping ratio, at a first end of hoisting ropes 134. Hoisting ropes 134 may be led to pass under elevator car 110 around at least one diverting pulley 111, for example, two diverting pulleys, mounted under elevator car 110. Hoisting ropes 134 may be led to pass from the at least one diverting pulley 111 over traction sheave 133. From traction sheave 133 hoisting ropes 134 may be led to pass around at least one diverting pulley 182 mounted to counterweight 182. Hoisting ropes 134 may be led further to pass from the at least one diverting pulley 182 to a point of attachment, at which second end the hoisting ropes 134 are secured, for example to the counterweight 182 or to an upper part of elevator shaft 102, depending on the roping ratio. Both ends of each hoisting rope are secured by a rope shackle 135. In at least one end of the plurality of the hoisting ropes 134, each of the plurality of elevator rope shackles 135 comprises a compression spring. Compression of the compression spring indicates the tension of the corresponding elevator rope. For each hoisting rope, the tension or the lack of it is monitored by a measurement device 136 such as a rope tension monitoring device illustrated in FIG. 1. Traction sheave 133 is driven by an electrical motor 132, which may be coaxial with traction sheave 133. Traction sheave 133 is illustrated to be mounted on a support 131, which may be further mounted to a supporting platform 130 that may be secured to the walls of elevator shaft 102. At the bottom of elevator shaft 102 there may be buffers such as buffer 103A and buffer 103B. Similar buffers (not shown) may be mounted to an upper part of elevator shaft 102. Elevator shaft 102 is shown to comprise landing doors 121, 122 and 123 on respective three landings (not shown). The number of landings is just for illustrative purposes and may be significantly higher or otherwise vary in various embodiments of the invention. Elevator car 110 comprises car doors 119 and a door controller 114 which controls elevator doors by driving at least one electrical motor configured to open and close elevator doors 119. Car doors 119 comprise at least one light curtain 115 which comprises a plurality of light sources such as Light-Emitting Diodes (LED) and a respective plurality of light sensors, for example, photovoltaic sensors, configured to determine whether light may be received unimpeded from the light sources. In normal use this means that whether a person stands between the light sources and the light sensors. To elevator car 110 is connected a travelling cable 184 which is suspended from elevator car 110 and connected to socket 108B at the car end of travelling cable 184, and suspended from elevator shaft 102 at the other end of travelling cable 184. The other end of travelling cable 184 is connected to socket 108A in a wall of elevator shaft 102. Strain from travelling cable 184 received at socket 108A, 108B, in different positions of elevator car 110 in elevator shaft 102 is measured with a strain sensor 109A, 109B, for example, a strain gauge. Travelling cable 184 is sized to allow a full range of operation for elevator car 110 up and down vertically in elevator shaft 102. Travelling cable 184 may be used to supply electrical power to elevator car 110 and may be used as a physical medium for at least one communication channel. Travelling cable 184 may comprise a bundle of electrical power supply cables and communication bus cables. Elevator car 110 comprises a door zone detector 112. Door zone detector 112 is configured either to read door zone indicator markings at a wall of elevator shaft 102 or receive door zone indicator signals from a plurality of short-range or line-of-sight transmitters mounted to the wall of elevator shaft 102. The door zone indicator markings at the wall of elevator shaft 102 may be spaced regularly or with increased precision at the vicinity of each landing. Similarly, the plurality of transmitters mounted to the wall of elevator shaft 102 may be spaced regularly or with increased precision at the vicinity of each landing. Door zone detector 112 may be configured to determine proximity of elevator car 110 to a position where elevator car doors 119 and landing doors of a landing such as landing doors 122 are properly aligned so that the floor of elevator car 110 is on the same level as the landing. Elevator car 110 is provided lighting from at least one lamp 116. Elevator car 110 is also equipped with at least one light sensor 117 such as at least one photovoltaic sensor which is configured to detect presence of lighting in elevator car 102. Elevator car 110 comprises also load weighing device 113, which is configured to measure the load inside elevator car 110. Elevator car 110 comprises an accelerometer 118 which measures acceleration of elevator car 110 with respect to the X, Y and Z axis directions.

Electrical motor 132 is supplied electricity from a three-phase electrical power supply 144, which may be a grid, via a frequency converter 142. Frequency converter 142 may supply a pulse-width modulated signal to electrical motor 132 via a three-phase electrical connection 140. Frequency converter 142 may be configured to measure a three-phase electrical signal generated in electrical motor 132 and supplied to converter 142 in response to a net torque induced about an axis of traction sheave 133 by a weight of elevator car 110 and a weight of counterweight 180 together with a weight of roping on respective sides of traction sheave 133 in a current position of elevator car 110. Frequency converter is communicatively connected to an elevator test unit 150 via a communication channel 156.

Elevator 100 comprises a seismic detector 171, which may be installed in association with elevator shaft 102. Seismic detector may be installed to a location in the vicinity of elevator shaft 102 where vibrations due to normal elevator car driving, that is, movement of elevator car 110 and movement of counterweight 180 do not cause interference. Seismic detector 171 may be implemented using at least one accelerometer.

In FIG. 1 there is illustrated elevator test unit 150. Elevator test unit 150 may be a computer unit or a processor board comprising a memory. Elevator test unit 150 may comprise an internal message bus 151 to which may be connected at least one processor 152, a memory 153 and an Input/Output (I/O) controller 154. I/O controller 154 may comprise a plurality of interfaces 160 to which may be connected a plurality of communication channels such as communication channels 161-168 illustrated in FIG. 1. Sensor devices connected to I/O controller 154 via one of the plurality of interfaces 160 may be assigned specific addresses so that an identity of a transmitting sensor device may be determined by I/O controller 154 from a transmission sent by the sensor device. The identity of the transmitting sensor may be comprised in the transmission, for example, in a message packet.

Communication channel 161 connects seismic detector 171 to one of the plurality of interfaces 160. Communication channel 162 connects elevator load weighing device 113 to one of the plurality of interfaces 160. Communication channel 163 connects door controller 114 to one of the plurality of interfaces 160. Communication channel 164 connects door zone detector 112 to one of the plurality of interfaces 160. Communication channel 165 connects the at least one light curtain 115 to one of the plurality of interfaces 160. Communication channel 166 connects the at least one light sensor 117 to one of the plurality of interfaces 160. Communication channel 167 connects strain sensor 109A to one of the plurality of interfaces 160. Communication channel 168 connects measurement devices 136 to one of the plurality of interfaces 160. Communication channel 169 connects accelerometer 118 of elevator car 110 to one of the plurality of interface 160. Communication channels 162-169 may be transmitted via a message bus which may be a part of travelling cable 184.

The at least one processor 152 is configured to store into memory 153 an array of strain measurements regarding the strain in travelling cable 184 at different positions of elevator car 110 in elevator shaft 102. The positions may be regularly spaced. The strain measurements are received over communication channels 167, 170 from strain sensors 109A, 109B. The strain measurements may be sent by strain sensors 109A, 109B periodically or in response to a request signal transmitted from elevator test unit 150 to strain sensors 109A, 109B. The at least one processor 152 is also configured to store into memory 153 an array of electrical power consumption measurements at different positions of elevator car 110 in elevator shaft 102. The positions may be regularly spaced. The electrical power consumption measurements may be received from converter 142 via communication channel 156. The power consumption measuring may be performed in converter 142, for example, using duty cycle length information used in pulse-width modulated signals transmitted to motor 132. The arrays of strain measurements and power consumption measurements are stored into memory 153 when elevator 100 has been installed and has been inspected by installation personnel to be functioning properly. The memory 153 may also store information on the torque required at the traction sheave 133 to keep the elevator car 110 stationary in the elevator shaft 102 as a function of the elevator car 110 position in the elevator shaft and load in the elevator car 110. By comparing this information to the actual net torque required to keep the elevator car 110 stationary after an earthquake, the elevator test unit 150 can determine integrity of counterweight 180, that is, that pieces of the counterweight have not dropped off.

In FIG. 1 it is assumed that elevator car 110 is at the time of an earthquake at landing 122, in the door zone of landing 122. When elevator testing is to be performed following an earthquake detected by seismic detector 171, elevator test unit 150 receives an indication signal from seismic detector 171, in response to seismic detector 171 determining that a predetermined time has elapsed since an acceleration of earthquake magnitude has been registered by seismic detector 171. In response to the indication signal, elevator test unit 150 transmits a measurement request signal to accelerometer 118 of elevator car 110. In response to the measurement request signal, accelerometer 118 starts measuring acceleration of elevator car 110. The measurements are conducted in order to determine that the movement of the elevator car 110 has settled so that it is possible to conduct functional testing of elevator car 110. Accelerometer 118 measures acceleration of elevator car 110 repeatedly until the acceleration of elevator car 110 stays within predefined limits for a predefined time, for example, 10 seconds. The predefined limits are determined beforehand and set to values that correspond to normal elevator operating conditions with respect to seismic activity. Thereupon, accelerometer 118 sends a signal to elevator test unit 150, the signal indicating that a post-earthquake elevator testing may be started by elevator test unit 150. Elevator test unit 150 conducts at least one static test which determines the condition of the elevator. A static test does not require driving of the elevator car. Following the at least one static test and a successful outcome of the at least one static test, elevator test unit 150 conducts at least one dynamic test. A dynamic test involves driving of elevator car 110 to at least one landing.

During the at least one static test, elevator test unit 150 receives information on the hoisting rope tensions from the plurality of measurement devices 136. Elevator test unit 150 determines whether the load is evenly distributed among the plurality of hoisting ropes 134. From an even distribution of load, elevator test unit 150 determines that the plurality of elevator ropes remain in place in their respective grooves of traction sheave 133 of elevator 100. If one of the hoisting ropes has slipped away from its groove in traction sheave 133, it will have a tension that significantly differs from that of the other ropes which also manifests itself in the compression of the shackle spring of the slipped rope.

Thereupon, elevator test unit 150 determines using at least one elevator car sensor that elevator car 110 is empty. The at least one sensor which determines that elevator car 110 is empty, comprises, for example, load weighing device 113, from which elevator test unit 150 receives at least one reading signal. In response to elevator test unit 150 determining that elevator car 110 is empty, elevator test unit 150 commences the at least one dynamic test.

In one embodiment of the invention, elevator test unit 150 determines, during the at least one static test, using door zone detector 112 that elevator car 110 is in a position within the door zone of landing 122 that matches a position recorded in memory 153 before the detection of the earthquake. The matching within predefined threshold limits is indicative that electrical motor 132 and traction sheave 133 are in place and support 131 and supporting platform 130 have not collapsed During the at least one dynamic test elevator car 110 is driven to at least one another landing. Elevator car 110 may be driven to landings 121, 122 and 123 in FIG. 1. Elevator test unit 150 is configured to instruct converter 142 to supply power to electrical motor 132 in order to drive elevator car 110 to landings 121, 122 and 123 one by one. During the at least one dynamic test, elevator test unit 150 may determine the condition of guide rails 104 as well as guide rails 106 by measuring friction received by elevator car 110 at different heights in elevator shaft 102. The friction is measured by measuring the power consumed at positions in elevator shaft 102 corresponding to the respective positions of the power consumption measurements in the array of power consumption measurements. The power consumption measured by converter 140 may be reported to elevator test unit 150. The measured power consumptions are compared by elevator test unit 150 to values in the array of power consumption measurements in memory 153. If the power consumption measurements match the respective power consumption measurements in the array, for example, within predefined threshold limits, guide rails 104 as well as guide rails 106 are considered to be in condition allowing normal operation of elevator 100. During the at least one dynamic test, elevator test unit 150 may measure strains received at sockets 108A, 108B at different positions of elevator car 110 in elevator shaft 102. The strains are measured using strain sensors 109A, 109B. The different positions correspond to the respective positions of the strain measurements in the array of strain measurements. The measured strains are compared by elevator test unit 150 to values in the array of strain measurements in memory 153. If the comparisons indicate matching values, for example, within predefined threshold limits, travelling cable 184 is considered not to be entangled. The at least one processor 152 may also be configured to store into memory 153 electrical power consumption measurements executed by the door controller 114 upon opening and closing of the car door 119 and landing doors 121, 122 and 123. During the at least one dynamic test, the operation of the is tested by stopping elevator car 110 at landings 121, 122 and 123 and by checking that door safety switches (not illustrated in FIG. 1) indicate that the doors open and close properly and that the friction determined while opening and closing the landing doors is within predefined threshold limits. The friction may be determined by electrical power consumption measurements executed by the door controller 114 upon opening and closing of the doors and reported back to elevator test unit 150. The reported power consumptions are compared by elevator test unit 150 to the corresponding values in memory 153. If the power consumption measurements match the respective power consumption measurements stored, for example, within predefined threshold limits, friction in the car door 119 and landing doors 121, 122 and 123 is considered to be in condition allowing normal operation of elevator 100.

In response to success of the at least one dynamic test and the at least one static test elevator 100 is returned to normal use by elevator test unit 150. In response to a failure in one of the at least one dynamic or static test, elevator 100 is put out of service. A fault signal may be transmitted from elevator test unit 150 to a remote node, which may be located in an elevator maintenance center.

In one embodiment of the invention, during the at least one static test, presence of a communication connection is determined between elevator test unit 150 and at least one circuit board in elevator car 110. The communication connection may be provided using travelling cable 184. If the communication connection is present, travelling cable 184 is assumed to be unharmed which entails that the at least one drive testing may be conducted provided that other static tests are successful.

In one embodiment of the invention, during the at least one static test, presence of lighting in elevator car 110 is determined using a light sensor 117 communicatively connected to elevator test unit 150. The lighting is powered via travelling cable 184. If lighting is present, the at least one drive testing may be conducted provided that other static tests are successful.

In one embodiment of the invention, during the at least one static test, presence of light signals is determined in at least one light curtain 115. There is detected a plurality of light signals in a plurality of light curtain sensors associated with door 119 of elevator car 110. The plurality of light signals is transmitted from a plurality of light sources which are powered via travelling cable 184. If light signals are received in all light curtain sensors, the at least one drive testing may be conducted provided that other static tests are successful.

The embodiments of the invention described hereinbefore in association with the summary of the invention and FIG. 1 may be used in any combination with each other. At least two of the embodiments may be combined together to form a further embodiment of the invention.

Figure 2A:
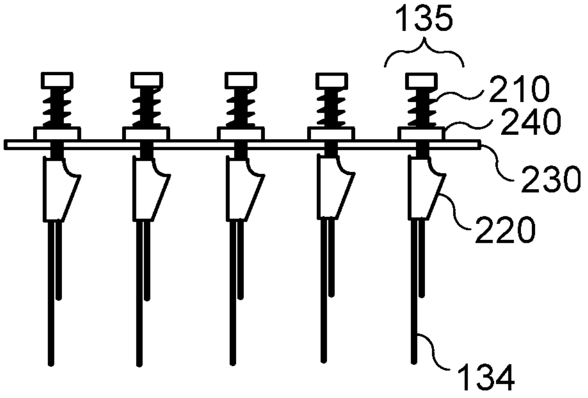
FIG. 2A illustrates a plurality of elevator rope shackles having shackle springs, wherein the shackle springs are equipped with devices measuring tension in the hoisting ropes, in one embodiment of the invention.

FIG. 2A illustrates a plurality of elevator rope shackles with means for determining rope tension according to one embodiment of the invention.

In FIG. 2A there is illustrated a plurality of elevator rope shackles 135 such as the plurality of elevator rope shackles 135 in FIG. 1. A rope shackle 220 is shown to comprise a portion of a hoisting rope among the plurality of hoisting ropes 134, which is secured to rope shackle 220, for example, with a wedge (not shown) comprised in a casing of rope shackle 220. Rope shackle 220 is suspended by compression spring 210 on a supporting plate 230 through both of which it extends as a threaded rod terminated by e.g. a nut and washer. A rope tension measurement device 240 is arranged for each elevator rope shackle 135. One embodiment of a rope tension measurement device may be a pressure sensor.

Figure 2B:
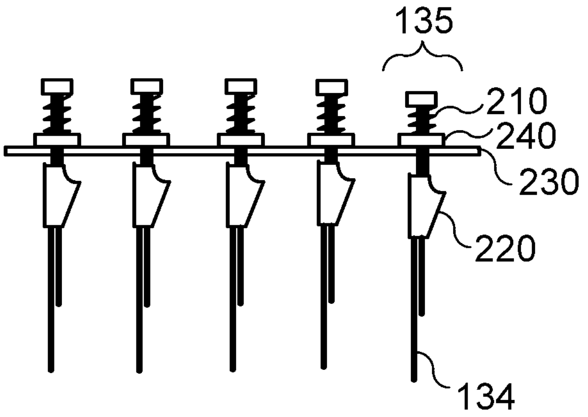
FIG. 2B illustrates the plurality of elevator rope shackles where compression of shackle springs indicate uneven distribution of load between hoisting ropes, in one embodiment of the invention.

FIG. 2B illustrates a plurality of elevator rope shackles 135 similar to the plurality of elevator rope shackles from FIG. 2A, in one embodiment of the invention. In FIG. 2B the hoisting rope tensions are distributed unevenly, indicated by shackle spring 210 having a compression significantly different compared to the other shackle springs.

Figure 3:
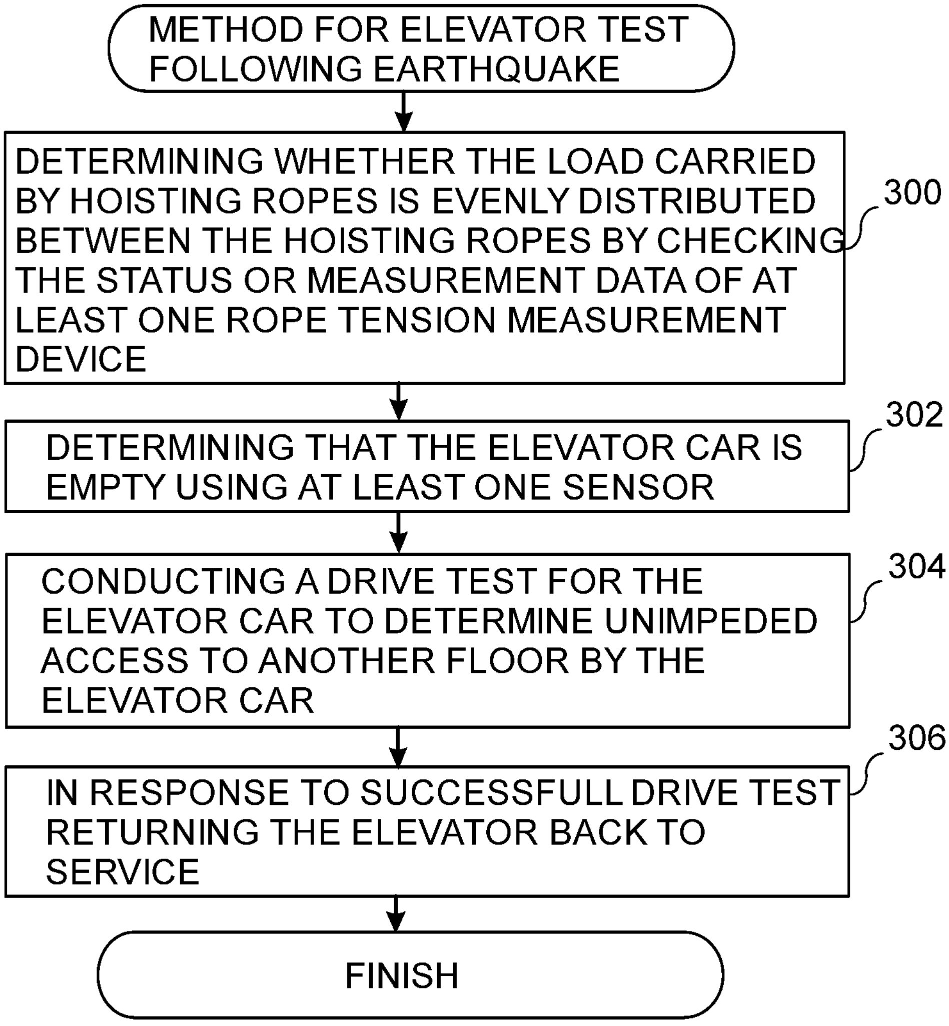
FIG. 3 is a flow chart illustrating a method for elevator testing after an earthquake in one embodiment of the invention.

FIG. 3 is a flow chart illustrating a method for elevator testing following an earthquake in one embodiment of the invention.

At step 300, it is determined by an elevator test unit whether the load carried by the hoisting ropes is evenly distributed between the ropes by checking the status or measurement data of the rope tension measurement devices.

he elevator test system may comprise at least one elevator test unit, which may be a computer comprising at least one processor, a memory, an input/output controller and interfaces for receiving signals from a plurality of sensors. The elevator test system may also comprise a communication channel to a frequency converter which supplies power to an electrical motor of the elevator. If an even distribution of load can be confirmed, the elevator test unit determines that the plurality of elevator ropes remain in place in respective grooves of a traction sheave.

At step 302, the elevator test system determines using at least one elevator car sensor that the elevator car is empty.

At step 304, the elevator test system conducts a drive test for the elevator car in order to determine unimpeded access for the elevator car to at least one second landing, in response to the determining that the plurality of elevator ropes remain in place in the respective grooves and that the elevator car is empty.

At step 306, the elevator test system returns the elevator to normal use, in response to the drive test indicating unimpeded access for the elevator to at least one second landing.

In one embodiment of the invention, by unimpeded access may be meant that the friction in guide rails of the elevator car and the counterweight are within predefined limits or that the elevator car may be driven to at least one landing so that the elevator travelling cable does not disconnect or break due to sudden strain.

In one embodiment of the invention, by unimpeded access may also be meant that the elevator car door and landing doors open and close normally.

Thereupon, the method is finished. The method steps may be performed in the order of the numbering of the steps.

The embodiments of the invention described hereinbefore in association with FIGS. 1, 2A, 2B and 3 or the summary of the invention may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Long-Term Evolution (LTE) networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magnetooptical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present invention has been described in connection with a number of exemplary embodiments and implementations, the present invention is not so limited, but rather covers various modifications and equivalent arrangements which fall within the purview of prospective claims.

The embodiments of the invention described hereinbefore in association with the figures presented and the summary of the invention may be used in any combination with each other. At least two of the embodiments may be combined together to form a further embodiment of the invention.

It is obvious to a person skilled in the art that, with the advancement of technology, the basic idea of the invention may be implemented in various ways. The invention and its embodiments are thus not limited to the examples described above; instead they may vary within the scope of the claims.

The invention claimed is:

1. A method for automatic condition checking of an elevator, wherein an elevator car of the elevator is positioned in a door zone of a first landing in an elevator shaft, the method comprising:

determining, by at least one elevator test unit, whether the load carried by hoisting ropes is evenly distributed between the hoisting ropes by checking the status or measurement data of at least one rope tension measurement device;

determining, by the at least one elevator test unit, using at least one elevator car sensor that the elevator car is empty;

conducting, by the at least one elevator test unit, a drive test for the elevator car in order to determine unimpeded access for the elevator car to at least one second landing, in response to the determining that the plurality of elevator ropes remain in place in the respective grooves and that the elevator car is empty;

wherein the conducting further comprises:

performing, by a frequency converter, a plurality of power consumption measurements at regular intervals from power consumed by an electrical motor coupled to the traction sheave;

transmitting, from the frequency converter, the plurality of power consumption measurements to the at least one elevator test unit;

comparing, by the at least one elevator test unit, the plurality of power consumption measurements to a plurality of reference values stored in a memory associated with the at least one elevator test unit;

determining that elevator car guide rails and counterweight guide rails are intact, in response to the plurality of power consumption measurements matching the plurality of reference values; and indicating correct functioning of the elevator, in response to the determining that the elevator car guide rails and the counterweight guide rails are intact; and returning the elevator to normal use, in response to the drive test indicating unimpeded access for the elevator to at least one second landing.

2. The method according to claim 1, the method further comprising:

determining, by the at least one elevator test unit, using an accelerometer associated with the elevator car that a predefined time has elapsed since a latest signal from the accelerometer indicates an acceleration exceeding a predefined threshold, the accelerometer being communicatively connected to the at least one elevator test unit, the predefined threshold being indicative of a lack of seismic activity; and enabling the conducting of the drive test in response to the elapsing of the predefined time.

3. The method according to claim 1, further comprising:

reading, by the at least one elevator test unit, the torque required at a traction sheave to keep the elevator car stationary in the elevator shaft as a function of the elevator car position in the elevator shaft and load in the elevator car from a memory associated with the at least one elevator test unit;

comparing the stored torque information to the actual net torque required to keep the elevator car stationary; and determining, in the at least one elevator test unit, that the counterweight is intact in response to the stored torque information matching the net torque, before the conducting of the drive test for the elevator car.

4. The method according to claim 1, wherein the step of conducting the drive test for the elevator car comprises:

performing a plurality of strain measurements indicating strain in a point of attachment of an elevator travelling cable in the elevator shaft or the elevator car, the elevator travelling cable being suspended from the elevator car and the elevator shaft;

comparing, by the at least one elevator test unit, the plurality of strain measurements to a plurality of reference values stored in a memory associated with the at least one elevator test unit; and determining that the elevator travelling cable is not entangled in response to the plurality of strain measurements matching the plurality of reference values; and indicating correct functioning of the elevator, in response to the determining that the elevator travelling cable is not entangled.

5. The method according to claim 1, wherein the step of conducting the drive test for the elevator comprises:

driving the elevator car to at least one second floor;

opening the landing doors in the at least one second landing;

opening the elevator car doors in the at least one second landing;

determining that safety switches in the landing doors and the elevator car doors open and close correctly;

determining, based on comparing electrical power consumption measurements executed by a door controller upon opening and closing of the landing doors to electrical power consumption measurements stored in a memory, that friction while opening and closing of the landing doors is within predefined limits; and indicating correct functioning of the elevator, in response to the determining that the safety switches in the landing doors and the elevator car doors open and close correctly and that the friction measured while opening and closing of the landing doors is within predefined limits.

6. The method according to claim 5, wherein a warning signal is given to elevator users while opening the landing doors and the elevator car doors in the at least one second landing, the warning signal being indicative of elevator test drive.

7. The method according to claim 1, further comprising:

determining a presence of a communication connection between the at least one elevator test unit and at least one circuit board in the elevator car, the communication connection being provided via a travelling cable suspended from the elevator shaft and the elevator car, the at least one elevator test unit being located outside the elevator car in association with the elevator shaft; and enabling the conducting of the drive test in response to the determining of the presence of the communication connection.

8. The method according to claim 1, further comprising:

detecting a lighting in the elevator car by a light sensor communicatively connected to the at least one elevator test unit, the lighting being powered via a travelling cable suspended from the elevator shaft and the elevator car; and enabling the conducting of the drive test in response to the detecting of the lighting.

9. The method according to claim 1, further comprising:

detecting a plurality of light signals in a plurality of light curtain sensors associated with a door of the elevator car, the plurality of light signals being transmitted from a plurality of light sources, the light sources being powered via a travelling cable suspended from the elevator shaft and the elevator car; and enabling the conducting of the drive test in response to the detecting of the plurality of light signals.

10. The method according to claim 1, further comprising:

determining a position of the elevator car within the door zone;

comparing determined position of the elevator car within the door zone to a position of the elevator car stored in a memory associated with the at least one elevator test unit when the elevator car stopped in the door zone; and enabling the conducting of the drive test, in response to the determined position matching the position of the elevator car stored in the memory.

11. The method according to claim 2, further comprising:

reading, by the at least one elevator test unit, the torque required at a traction sheave to keep the elevator car stationary in the elevator shaft as a function of the elevator car position in the elevator shaft and load in the elevator car from a memory associated with the at least one elevator test unit;

comparing the stored torque information to the actual net torque required to keep the elevator car stationary; and determining, in the at least one elevator test unit, that the counterweight is intact in response to the stored torque information matching the net torque, before the conducting of the drive test for the elevator car.

12. The method according to claim 2, wherein the step of conducting the drive test for the elevator car comprises:

performing a plurality of strain measurements indicating strain in a point of attachment of an elevator travelling cable in the elevator shaft or the elevator car, the elevator travelling cable being suspended from the elevator car and the elevator shaft;

comparing, by the at least one elevator test unit, the plurality of strain measurements to a plurality of reference values stored in a memory associated with the at least one elevator test unit; and determining that the elevator travelling cable is not entangled in response to the plurality of strain measurements matching the plurality of reference values; and indicating correct functioning of the elevator, in response to the determining that the elevator travelling cable is not entangled.

13. The method according to claim 3, wherein the step of conducting the drive test for the elevator car comprises:

performing a plurality of strain measurements indicating strain in a point of attachment of an elevator travelling cable in the elevator shaft or the elevator car, the elevator travelling cable being suspended from the elevator car and the elevator shaft;

comparing, by the at least one elevator test unit, the plurality of strain measurements to a plurality of reference values stored in a memory associated with the at least one elevator test unit; and determining that the elevator travelling cable is not entangled in response to the plurality of strain measurements matching the plurality of reference values; and indicating correct functioning of the elevator, in response to the determining that the elevator travelling cable is not entangled.

14. The method according to claim 2, wherein the step of conducting the drive test for the elevator comprises:

driving the elevator car to at least one second floor;

opening the landing doors in the at least one second landing;

opening the elevator car doors in the at least one second landing;

determining that safety switches in the landing doors and the elevator car doors open and close correctly;

determining, based on comparing electrical power consumption measurements executed by a door controller upon opening and closing of the landing doors to electrical power consumption measurements stored in a memory, that friction while opening and closing of the landing doors is within predefined limits; and indicating correct functioning of the elevator, in response to the determining that the safety switches in the landing doors and the elevator car doors open and close correctly and that the friction measured while opening and closing of the landing doors is within predefined limits.

15. The method according to claim 3, wherein the step of conducting the drive test for the elevator comprises:

driving the elevator car to at least one second floor;

opening the landing doors in the at least one second landing;

opening the elevator car doors in the at least one second landing;

determining that safety switches in the landing doors and the elevator car doors open and close correctly;

determining, based on comparing electrical power consumption measurements executed by a door controller upon opening and closing of the landing doors to electrical power consumption measurements stored in a memory, that friction while opening and closing of the landing doors is within predefined limits; and indicating correct functioning of the elevator, in response to the determining that the safety switches in the landing doors and the elevator car doors open and close correctly and that the friction measured while opening and closing of the landing doors is within predefined limits.

16. The method according to claim 4, wherein the step of conducting the drive test for the elevator comprises:

driving the elevator car to at least one second floor;

opening the landing doors in the at least one second landing;

opening the elevator car doors in the at least one second landing;

determining that safety switches in the landing doors and the elevator car doors open and close correctly;

determining, based on comparing electrical power consumption measurements executed by a door controller upon opening and closing of the landing doors to electrical power consumption measurements stored in a memory, that friction while opening and closing of the landing doors is within predefined limits; and indicating correct functioning of the elevator, in response to the determining that the safety switches in the landing doors and the elevator car doors open and close correctly and that the friction measured while opening and closing of the landing doors is within predefined limits.

17. The method according to claim 2, further comprising:

determining a presence of a communication connection between the at least one elevator test unit and at least one circuit board in the elevator car, the communication connection being provided via a travelling cable suspended from the elevator shaft and the elevator car, the at least one elevator test unit being located outside the elevator car in association with the elevator shaft; and enabling the conducting of the drive test in response to the determining of the presence of the communication connection.

18. An apparatus comprising at least one processor and at least one memory including computer program code, the at least one memory and the computer program code configured to, with the at least one processor, cause the apparatus at least to perform:

determining, by the apparatus, whether the load carried by hoisting ropes is evenly distributed between the hoisting ropes by checking the status or measurement data of at least one rope tension measurement device;

determining, by the apparatus, using at least one elevator car sensor that the elevator car is empty, wherein the elevator car of the elevator is positioned in a door zone of a first landing in an elevator shaft;

conducting, by the apparatus, a drive test for the elevator car in order to determine unimpeded access for the elevator car to at least one second landing, in response to the determining that the plurality of elevator ropes remain in place in the respective grooves and that the elevator car is empty;

wherein the conducting further comprises:

performing, by a frequency converter, a plurality of power consumption measurements at regular intervals from power consumed by an electrical motor coupled to the traction sheave;

transmitting, from the frequency converter, the plurality of power consumption measurements to the apparatus;

comparing, by the apparatus, the plurality of power consumption measurements to a plurality of reference values stored in a memory associated with the apparatus;

determining that elevator car guide rails and counterweight guide rails are intact, in response to the plurality of power consumption measurements matching the plurality of reference values; and indicating correct functioning of the elevator, in response to the determining that the elevator car guide rails and the counterweight guide rails are intact; and returning the elevator to normal use, in response to the drive test indicating unimpeded access for the elevator to at least one second landing.

19. A non-transitory computer readable medium encoded with instructions executable by a computer to cause the following when executed on a data-processing system:

determining, by at least one elevator test unit, whether the load carried by hoisting ropes is evenly distributed between the hoisting ropes by checking the status or measurement data of at least one rope tension measurement device;

determining, by the at least one elevator test unit, using at least one elevator car sensor that the elevator car is empty, wherein the elevator car of the elevator is positioned in a door zone of a first landing in an elevator shaft;

conducting, by the at least one elevator test unit, a drive test for the elevator car in order to determine unimpeded access for the elevator car to at least one second landing, in response to the determining that the plurality of elevator ropes remain in place in the respective grooves and that the elevator car is empty, wherein the conducting further comprises:

performing, by a frequency converter, a plurality of power consumption measurements at regular intervals from power consumed by an electrical motor coupled to the traction sheave;

transmitting, from the frequency converter, the plurality of power consumption measurements to the at least one elevator test unit;

comparing, by the at least one elevator test unit, the plurality of power consumption measurements to a plurality of reference values stored in a memory associated with the at least one elevator test unit;

determining that elevator car guide rails and counterweight guide rails are intact, in response to the plurality of power consumption measurements matching the plurality of reference values; and indicating correct functioning of the elevator, in response to the determining that the elevator car guide rails and the counterweight guide rails are intact; and returning the elevator to normal use, in response to the drive test indicating unimpeded access for the elevator to at least one second landing.

20. The computer program according to claim 19, wherein said computer program is stored on a non-transitory computer readable medium.

* * * * *